United States Patent [19]
Putora

[11] Patent Number: 5,593,078
[45] Date of Patent: Jan. 14, 1997

[54] MOTION PICTURE FILM ADVANCEMENT APPARATUS WITH VIBRATION REDUCTION

[75] Inventor: Ivan Putora, Scarborough, Canada

[73] Assignee: Precision Camera Inc., Toronto, Canada

[21] Appl. No.: 362,685

[22] Filed: Dec. 22, 1994

[51] Int. Cl.⁶ .................................................. B65H 20/22
[52] U.S. Cl. ............................................. 226/81; 226/178
[58] Field of Search ................................. 226/52, 81, 82, 226/178

[56] References Cited

U.S. PATENT DOCUMENTS

| | | |
|---|---|---|
| 2,176,517 | 10/1939 | Wittel . |
| 2,271,306 | 1/1942 | Nichols ............................ 226/81 |
| 2,277,693 | 3/1942 | Dybvig . |
| 2,695,546 | 11/1954 | Evans . |
| 2,809,829 | 10/1957 | Turner ............................ 226/81 |
| 2,815,672 | 12/1957 | Storer . |
| 2,903,900 | 9/1959 | Howard . |
| 2,913,093 | 11/1959 | Bevan ............................ 226/81 |
| 2,919,916 | 1/1960 | Davidson et al. . |
| 2,923,543 | 2/1960 | Metzner et al. . |
| 3,229,879 | 1/1966 | Bach . |
| 3,249,274 | 5/1966 | Borberg . |
| 3,386,636 | 6/1968 | Badalich . |
| 3,618,837 | 11/1971 | Jacobsen . |

FOREIGN PATENT DOCUMENTS 0065876  6/1950  Netherlands ............................ 226/82

*Primary Examiner*—Daniel P. Stodola
*Assistant Examiner*—Matthew A. Kaness
*Attorney, Agent, or Firm*—Bereskin & Parr

[57] ABSTRACT

A rotary film advancement apparatus for use in a motion picture camera or projector which uses film having pairs of evenly spaced perforations located near the edges of the film having a steering channel which defines a closed loop path having a pre-selected contour. A rotor is mounted on the stator and rotates at a selected angular velocity in a given direction of rotation about a rotor axis which extends through the interior of the closed loop contour. At least one claw is pivotally mounted to the rotor about a pivot axis which is radially spaced from the rotor axis and has a claw tip dimensioned to engage a film perforation. The claw tip rotates with the rotor at a claw tip rotational speed. A steering pin spaced from the claw tip and the pivot axis follows the path of the steering channel thereby pivoting the claw tip both forwardly and backwardly, and inwardly and outwardly.

20 Claims, 4 Drawing Sheets

MOTION PICTURE FILM ADVANCEMENT APPARATUS WITH VIBRATION REDUCTION

FIELD OF THE INVENTION

The present invention relates to film advancing devices used in motion picture cameras or projectors.

BACKGROUND OF THE INVENTION

Motion picture cameras require a mechanism which advances the film past the camera shutter in an orderly fashion. In the case of most cameras, the film advancement mechanism comprises one or more claws which engage evenly spaced perforations located in the edges of the film and propel the film in a given direction. The advancement of the film occurs intermittently in a cyclical fashion, which as a general industry standard in cinematography occurs at 24 frames per second.

The film advancement cycle consists of a "pull down period" during which the film is advanced one frame, and a "dwell period" during which the film is stationery and is exposed when the camera shutter opens. During the pull down period, when the film perforation is engaged by the claws, the film is accelerated, decelerated, stopped, and finally the claws are disengaged from the film perforation.

In order to maximize the exposure time, and for high speed filming, the pull down period should be as short as possible. This requires that the film be advanced at a high rate of speed during the pull down period, which translates into high speeds of engagement and disengagement and high rates of acceleration and deceleration.

"Sawing" of the film perforation may occur during engagement and disengagement of the claw with the perforation. Sawing is due to lateral movement of the claw across the edge of a film perforation which causes wear on the perforation edges and ultimately damage to the film. The greater the speed of engagement and disengagement, the greater the lateral movement and the greater the sawing tendency. It is therefore desirable that engagement and disengagement of the claw with the film occur as smoothly and gently as possible to minimize sawing tendencies.

There is a further requirement that the film indexing from one frame to the next be as accurate and as consistent as possible. In order to achieve accurate indexing the claw should fit tightly in the film perforation in order to minimize film drift due to play between the claw and the perforation.

A number of prior art film advancement devices use reciprocating claw movements to advance the film during the pull down period. This type of device is exemplified in Borberg U.S. Pat. No. 3,249,274, Bach U.S. Pat. No. 3,229,879, and in Jacobsen U.S. Pat. No. 3,618,837. In the Bach device there is a substantial amount of sawing of the claw with the film due to the large lateral movement of the claw over the film perforation. In the Borberg device the claws do not decelerate the film; in fact the film impinges on the claws ejecting them and resulting in sawing action and film drift.

Additionally these devices tend to be inherently unbalanced causing unwanted vibration levels and being very complicated as evidenced by the complexity and number of parts required in the Jacobsen device.

There is accordingly a need for a simple, inexpensive film advancement device which minimizes the sawing of film perforations, the vibration levels, and the duration of the pull down period. There is a further need for a device in which the pull down period can be finely predetermined to ensure gentle engagement, smooth acceleration, smooth deceleration and gentle disengagement of the film.

SUMMARY OF THE INVENTION

The present invention is a rotary film advancement apparatus for use in a motion picture camera or projector which uses film having pairs of evenly spaced perforations located near the edges of the film. The subject advancement apparatus comprises a stator which has a cam means for defining a closed loop path having a preselected contour and a rotor mounted on the stator which rotates at a selected angular velocity in a given direction of rotation about a rotor axis which extends through the interior of the closed loop contour.

At least one claw is pivotally mounted to the rotor about a pivot axis which is radially spaced from the rotor axis and has a claw tip dimensioned to engage a film perforation. The claw tip rotates with the rotor at a claw tip rotational speed. A cam follower means spaced from the tip and the pivot axis follows the path of the cam means. The contour is shaped to pivot the claw tip both radially outwardly and backwardly relative to the direction of rotation during engagement of the claw tip with the film perforation. This contour reduces the claw tip rotational speed and results in gentle engagement with the film perforation.

The contour is preferably shaped to pivot the claw tip both radially inwardly and backwardly relative to the direction of rotation for gentle disengagement with the film perforation after advancing the film a preselected distance. The contour is also preferably shaped to pivot the claw tip to reduce the claw tip speed in the direction of rotation to approximately zero at the point of engagement and disengagement with the film perforation. The cam means preferably comprises a steering channel formed in a surface of the stator. The cam follower means may comprise a steering pin projecting laterally towards the surface and dimensioned to be slidably received within the steering channel.

The subject apparatus preferably comprises a matched pair of claws comprising a steering claw rigidly coupled to a following claw by a claw axle which extends along the pivot axis. The stator may comprise a film guiding means for guiding the film around a portion of the circumference of the rotor, the guiding means spaced from the rotor axis and being concentric to the circumference of the rotor.

BRIEF DESCRIPTION OF THE DRAWINGS

The invention will now be described by way of example only, with references to the following drawings in which.

DETAILED DESCRIPTION OF THE PREFERRED EMBODIMENT

Figure 1:
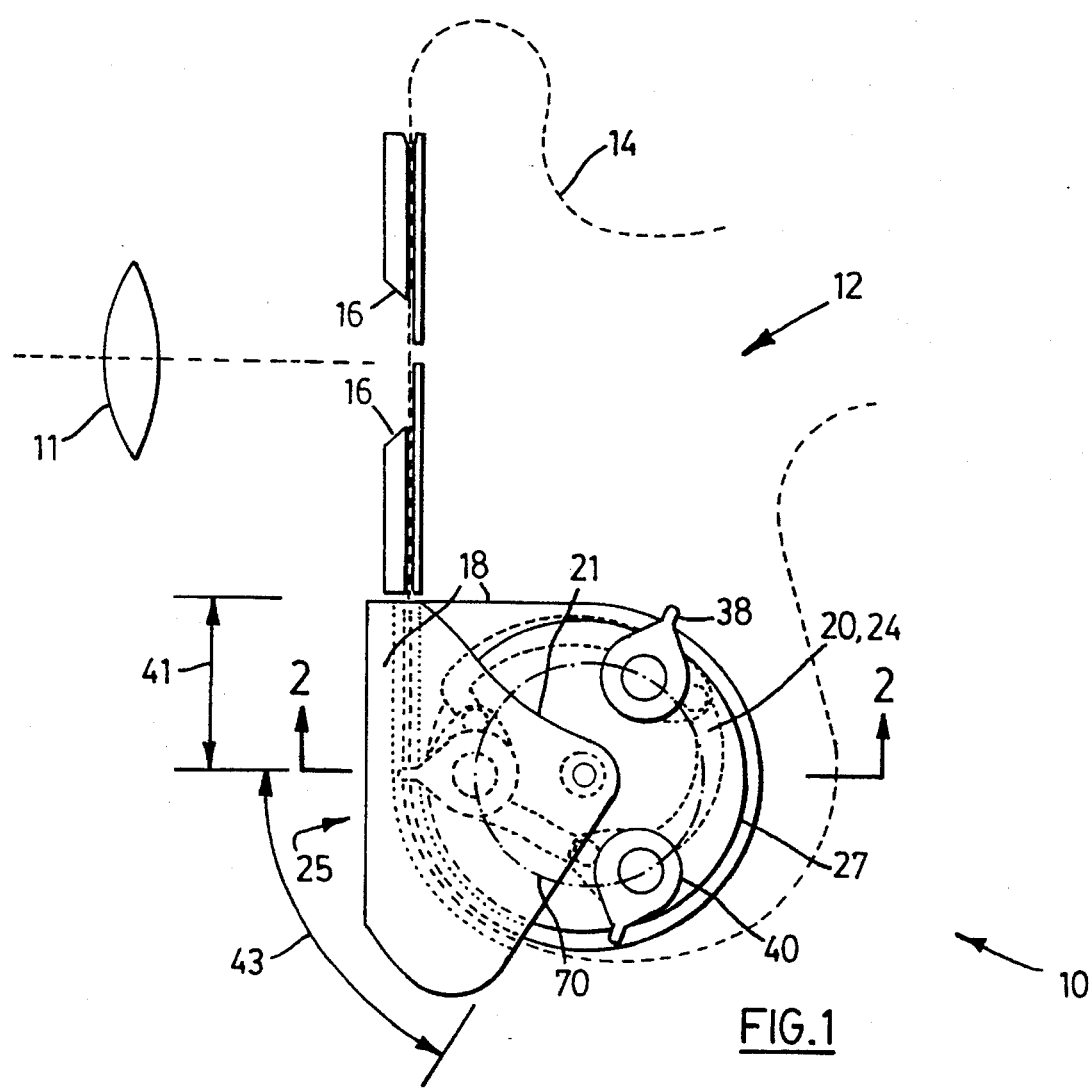
FIG. 1 is a side elevational view of a preferred embodiment of a rotary film advance apparatus made in accordance with the subject invention, mounted in a schematic representation of a portion of a motion picture camera or projector showing some concealed components in dotted outline.
Figure 2:
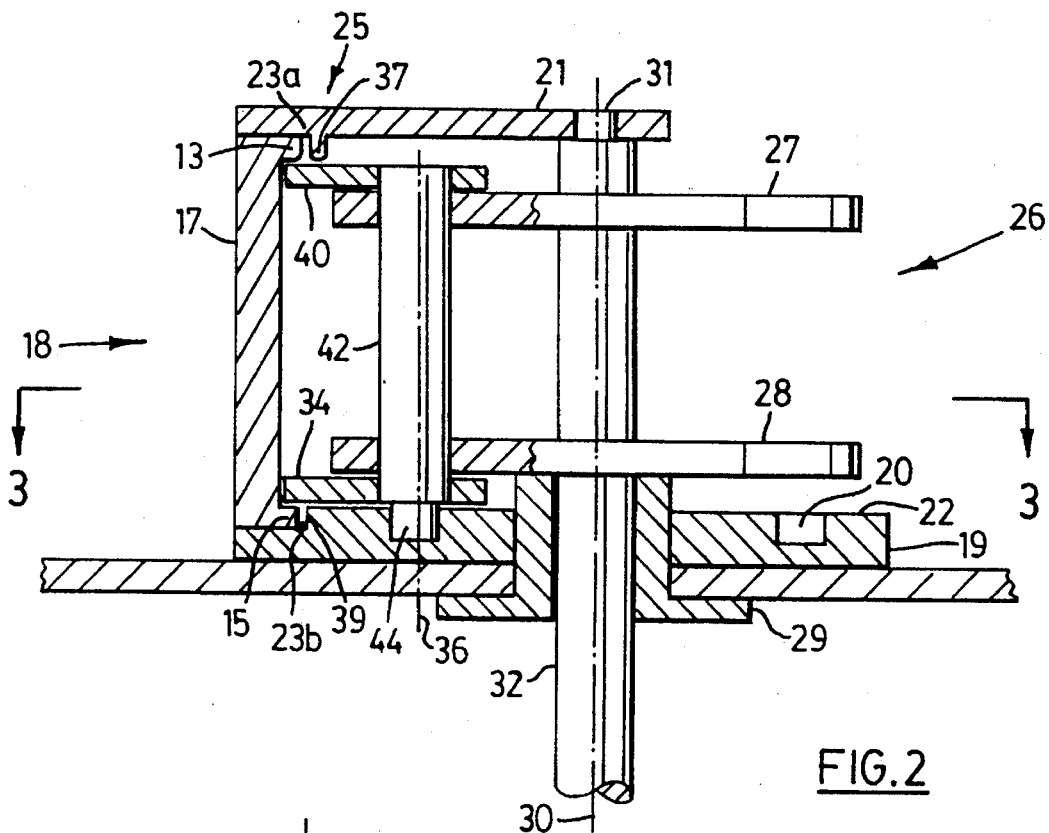
FIG. 2 is a sectional view of the rotary film advance apparatus taken along line 2—2 shown in FIG. 1.
Figure 3:
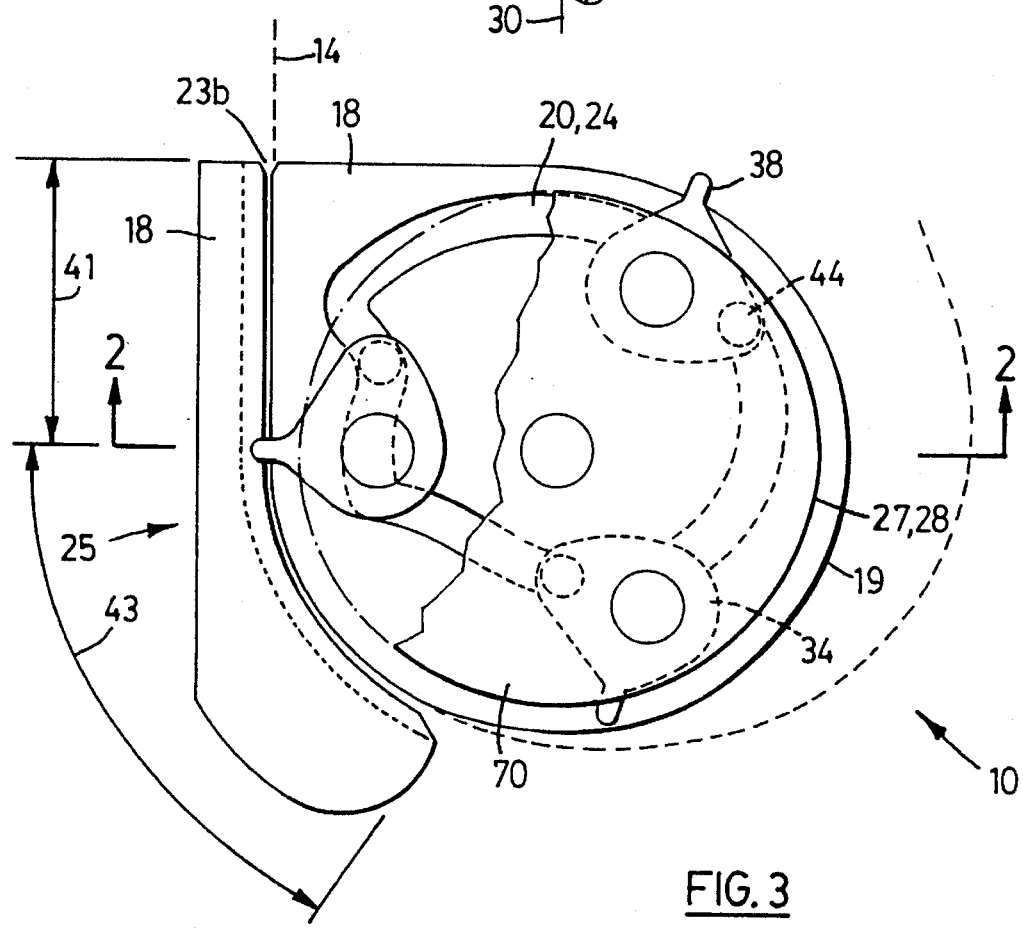
FIG. 3 is a partially broken away sectional view through line 3—3 shown in FIG. 2.

Referring to FIGS. 1, 2 and 3, a preferred embodiment of the present invention is a rotary film advance mechanism 10 shown mounted in a schematic representation of a motion picture camera or projector 12. Film 14 is advanced by the rotary film advancement mechanism 10 during the pull down period in between a film gate 16 where it is exposed during the dwell period of the advancement cycle, by light rays focused by lens 11.

The subject film advance mechanism 10 comprises a stator shown generally as 18 which includes a steering plate 19 having a cam means in the form of a steering channel 20 formed in a surface 22 thereof. Steering channel 20 defines a closed loop path having a preselected asymmetric contour 24.

A rotor 26 in the form of a pair of spaced discs 27, 28 is pivotally mounted on stator 18 and rotates at a selected angular velocity in a given direction of rotation about a rotor axis 30 which extends through the interior of the closed loop contour 24. Rotor discs 27, 28 are rigidly coupled to a rotor axle 32 which extends along the rotor axis 30, the discs 27, 28 being concentric about the rotor axis 30. The rotor axle 32 is pivotally mounted in a steering bushing 29 in the steering plate 19 and a follower bearing 31 in the follower plate 21.

The stator 18 incorporates film guiding means shown generally as 25 which guides the film around a portion of the circumference of rotor 26. Film guiding means 25 comprises a cross member 17 rigidly connected to steering plate 19 and follower plate 21 parallel to and spaced from the steering plate 19. Cross member 17 has a top flange 13 and a bottom flange 15. Follower plate 21 is provided with a rib 37 spaced from top flange 13 to form film channel 23a dimensioned to slidably receive one edge of the film. Likewise steering plate 19 includes an abutment 39 spaced from bottom flange 15 to form film channel 23b. Film channels 23a, 23b have a straight section 41 and an arcuate section 43, concentric with the circumference of rotor 26.

Three equally spaced steering claws 34 are pivotally mounted to disc 28 about pivot axes 36 which are radially spaced from the rotor axis 30. Similarly, three following claws 40 are pivotally mounted to disc 27 about a pivot axes 36 which are radially spaced from rotor axis 30. Each steering claw 34 is rigidly coupled to following claw 40 by a claw axle 42 which extends along the pivot axis 36 and is pivotally mounted to the discs 27, 28. Each claw has a claw tip 38 which is slightly smaller than a film perforation. Claw tips 38 rotate with the rotor 26 at a variable claw tip rotational speed, as a result of the pivoting action described herein below.

Figure 4:
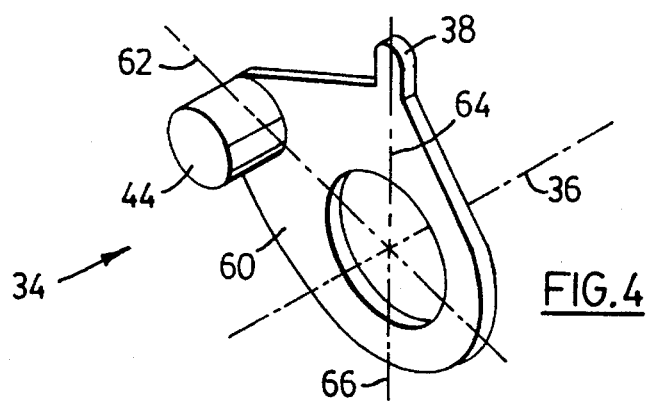
FIG. 4 is a perspective view of a claw of the preferred embodiment.

As best shown in FIG. 4, each of steering claws 34 is provided with a cam follower means in the form of a steering pin 44 which projects laterally towards the surface 22 of the steering plate 19. The steering pin 44 is spaced from the claw tip 38 and the pivot axis 36 and dimensioned to be slidably received within steering channel 20. The steering pin 44 follows the path of the steering channel 20. Claw 34 has a bell crank geometry which has a pin arm 60 which extends along the pin axis 62, which is orthogonal to a claw tip arm 64 which extends along the tip axis 66.

Figure 5:
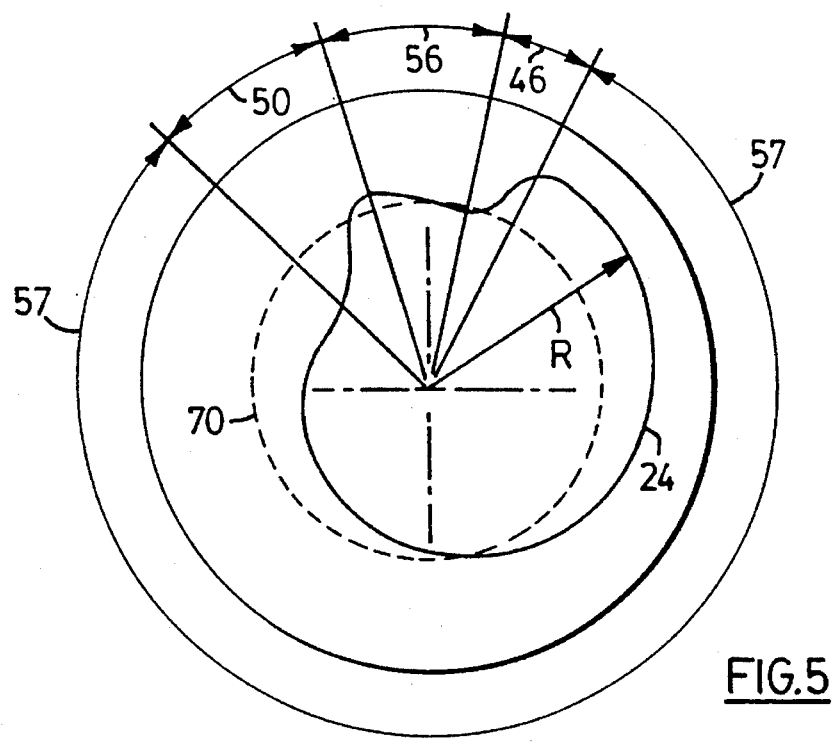
FIG. 5 is a schematic representation of the steering channel contour showing the critical sections of the contour.
Figure 6:
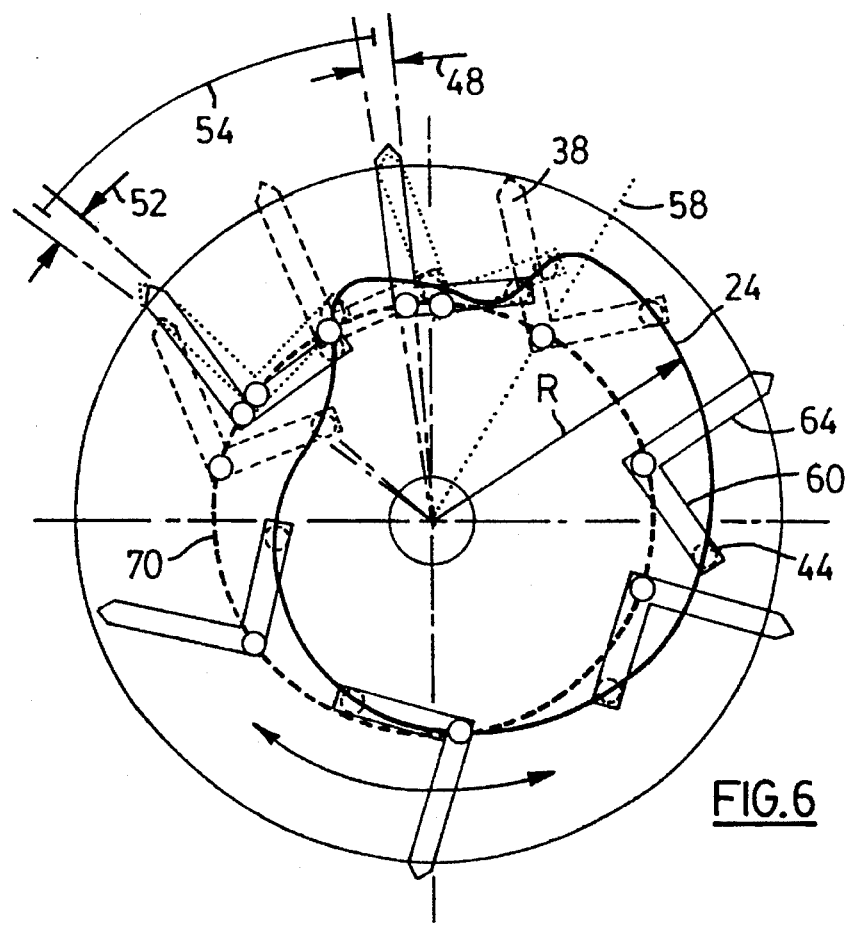
FIG. 6 is a schematic representation of the steering channel contour with claws positioned at various locations along the contour.

Referring now to FIGS. 5 and 6, steering channel 20 has an asymmetric contour 24 of variable radius R. As rotor 26 rotates, the pivot points of claws 34 rotate in a circular path 70. During the engaging section 46, the radius R of contour 24 decreases, causing claw tip 38 to pivot both radially outwardly and backwardly relative to the direction of rotation of the rotor 26. This in turn reduces the claw tip rotational speed so that claw tip 38 gently engages the film perforation at the engagement location 48. During the acceleration section 56 of the contour, the contour radius R increases, causing claw tip 38 to pivot forward, thereby accelerating film 14 to a speed exceeding the rotational speed of the rotor. During the disengaging section 50 of the contour 24, the contour radius R is further decreased, causing claw tip 38 to pivot both radially inwardly and backwardly relative to the direction of rotation. This gently disengages the claw tip 32 from the film perforation at the disengagement location 52, after advancing the film a preselected pull down distance 54 corresponding to one frame width.

In the preferred embodiment of the invention, engaging section 46 of contour 24 is shaped to pivot claw tip 38 so as to reduce the claw tip 38 speed in the direction of rotation to approximately zero at the point the claw tip 38 engages and disengages the film perforation.

Contour 24 is also preferably shaped to slowly increase the radius R of contour 24 during the dwell section 57 to a maximum value at point 58. As radius R is increasing, claw tip 38 is slowly pivoted forward until the pin returns to the starting position 58, at the beginning of engagement section 46.

Figure 7:
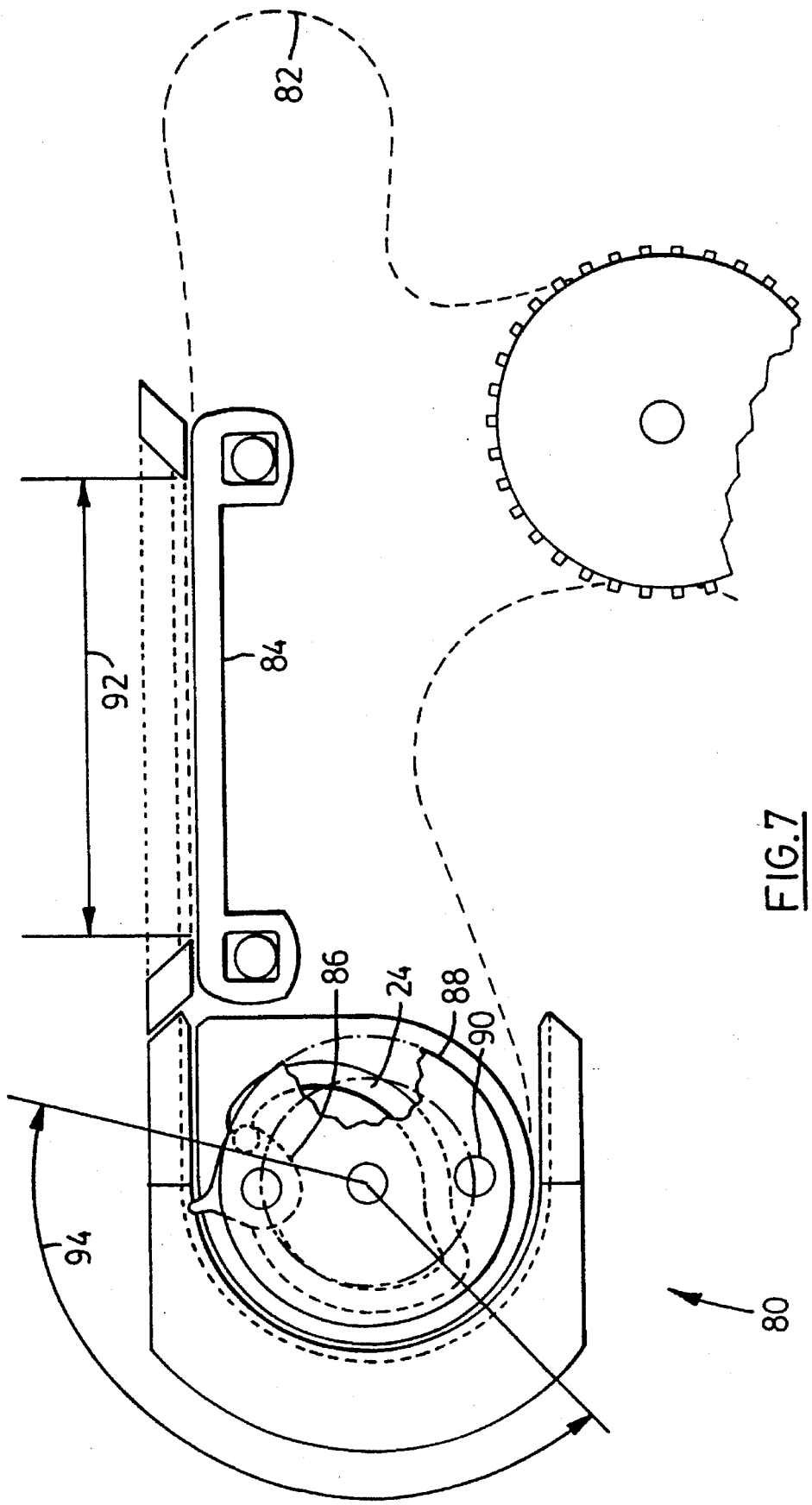
FIG. 7 is a top plan view of an alternative embodiment shown mounted in a camera designed to use wide frame film.

Referring now to FIG. 7, illustrated therein is an alternative embodiment of the invention shown generally as 80, adapted for use with 65 mm or 70 mm film having 15 perforations per film frame. Film 82 is advanced by rotary film advancement mechanism 80 during the pull down period in between a film gate 84. One claw 86 is pivotally mounted on rotor 88 and is counter balanced by counter weight 90 so as to minimize vibration. The large frame width 92 requires a correspondingly large pre-selected distance which in turn results in a large accelerating section 94 of the contour 24. In this embodiment the rotor 88 revolves one revolution per each frame advancement cycle.

In use, the subject apparatus 10 advances one frame of the film as follows. Beginning at the starting position 58, steering channel 20 is contoured to pivot the claw tip 38 radially outwardly and backwardly during the engaging section 46 to smoothly and gently engage a film perforation at the engagement location 48 at a claw tip 38 speed of approximately zero with respect to the film. Subsequently during the accelerating section 56, the steering channel 20 is contoured to pivot the claw tip 38 forwardly to accelerate the film to a speed greater than the rotational speed of the rotor 26. Next during the disengaging section, the steering channel 20 is contoured to pivot the claw tip 38 backwardly and inwardly to smoothly decelerate the film and gently disengage the claw tip 38 at the disengagement location 52 and at zero rotational speed. Finally during the dwell section 57, the steering channel 20 is contoured to pivot the claw tip 38 forwardly, completing the cycle when the steering pin 44 returns to the starting position 58.

The mechanism described above will operate with the rotor 26 rotating in either clockwise or counterclockwise directions. Reversing directions will reverse the engagement location 48 and disengagement section 50.

This rotary film advancement apparatus can advance film at very high speeds while minimizing vibration, the pull down period, and sawing of the film perforations.

While the embodiments described and illustrated herein comprise one or three pairs of axially linked claws 34, it will be apparent that different combinations of claws could be used. It is also apparent that by changing the contour and in particular by selecting other preselected pull down distances 54, various film frame sizes can be accommodated including for example 35 mm, 65 mm and 70 mm frame sizes, by varying the width between axially linked claws.

Furthermore changing the number of claws, the diameter and speed of the rotor, and the contour of the steering channel, will produce various combinations of film speed, frame size, dwell period and pull down period which can be used to optimize the filming process.

It should therefore be apparent to persons skilled in the art that various modifications and adaptations of the structure described above are possible without departure from the spirit of the invention, the scope of which is defined in the appended claims.

I claim:

1. A rotary film advance apparatus for use in a motion picture camera or projector using film having pairs of evenly spaced perforations located near the edges of the film, the rotary film advance apparatus comprising:

(a) a stator including cam means for defining a closed loop path having a pre-selected contour;

(b) a rotor mounted on the stator and rotatable at a selected angular velocity in a given direction of rotation about a rotor axis extending through the interior of the closed loop contour; and (c) at least one claw pivotally mounted to the rotor about a pivot axis radially spaced from the rotor axis including a claw tip dimensioned to engage a film perforation, the claw tip rotating with the rotor at a claw tip rotational speed, and cam follower means spaced from the claw tip and pivot axis, for following the path of the cam means;

(d) wherein the contour is shaped to pivot the claw tip both radially outwardly and backwardly relative to the direction of rotation thereby reducing the claw tip rotational speed to approximately zero at the point of engagement with the film perforation.

2. The apparatus defined in claim 1, wherein the contour is further shaped to pivot the claw tip both radially inwardly and backwardly relative to the direction of rotation during disengagement with the film perforation after advancing the film a preselected distance.

3. The apparatus as defined in claim 2, wherein the contour is shaped to pivot the claw tip to reduce the claw tip rotational speed in the direction of rotation to approximately zero at the point of engagement with the film perforation, such that the claw tip engagement with the film perforation occurs when the claw tip speed is approximately zero.

4. The apparatus as defined in claim 2, wherein the contour is shaped to pivot the claw tip forward to propel the film at a speed exceeding the angular velocity of the rotor, following engagement with the film perforation.

5. The apparatus as defined in claim 4, wherein the contour is shaped to pivot the claw tip backward to decelerate the film just prior to disengagement.

6. The apparatus as defined in claim 2, wherein the contour is shaped to pivot the claw tip to reduce the claw tip speed in the direction of rotation to approximately zero at the point of disengagement with the film perforation, such that the tip disengagement with the film perforation occurs when the claw tip speed is approximately zero.

7. The apparatus as defined in claim 2, wherein the contour is shaped to pivot the claw tip to reduce the claw tip speed in the direction of rotation to zero at the point of engagement with the film perforation, such that the tip engagement with the film perforation occurs when the claw tip speed is zero.

8. The apparatus defined in claim 1, wherein the cam means comprises an asymmetric steering channel formed in a surface of the stator having a variable radius.

9. The apparatus defined in claim 8, wherein the cam follower means comprises a steering pin projecting laterally towards the surface of the stator and dimensioned to be slidably received within the steering channel.

10. The apparatus defined in claim 9, wherein the at least one claw comprises a steering claw rigidly coupled to a following claw by a claw axle extending along the pivot axis, the steering claw provided with the steering pin, the claw axle being pivotally mounted to the rotor.

11. The apparatus defined in claim 10, wherein the rotor comprises a pair of spaced discs being rigidly coupled to a rotor axle extending along the rotor axis, the discs being concentric about the rotor axis.

12. The apparatus defined in claim 9, wherein the claw tip is located on a tip axis and the steering pin is located on a pin axis, the pin axis and tip axis intersecting at the pivot axis.

13. The apparatus defined in claim 12, wherein the claw has a pin arm extending along the pin axis, the pin arm being orthogonal to a claw tip arm extending along the tip axis.

14. The apparatus as defined in claim 8, wherein the radius of the steering channel is continuously reduced during an engagement section of the contour thereby guiding the steering pin radially inwardly toward the rotor axis, and slowing the rotational speed of the claw tip.

15. The apparatus as defined in claim 14, wherein the radius of the steering channel is increased during an accelerating section of the contour, after the film is engaged, thereby guiding the steering pin radially outwardly away from the rotor axis and increasing the rotational speed of the claw tip.

16. The apparatus as defined in claim 15, wherein the radius of the steering channel is continuously further reduced thereby guiding the steering pin radially inwardly toward the rotor axis and slowing the rotational speed of the claw tip.

17. The apparatus as defined in claim 16, wherein the radius of the steering channel is continuously and slowly increased thereby guiding the steering pin radially outwardly during a dwell section of the contour, thereby returning the steering pin to a pre-selected starting position just prior to the engagement section.

18. The apparatus as defined in claim 1, wherein the a least one claw comprises three equally spaced claws mounted on the rotor.

19. The apparatus as defined in claim 1, wherein the stator further comprises a film guiding means for guiding the film around a portion of the circumference of the rotor, the guiding means being spaced from the rotor axis and concentric to the circumference of the rotor.

20. The apparatus as defined in claim 19, wherein the film guiding means comprises a pair of spaced film channels dimensioned to receive slidably a portion of each film edge.

\* \* \* \* \*